United States Patent
Yoon et al.

(10) Patent No.: US 12,420,223 B2
(45) Date of Patent: Sep. 23, 2025

(54) COMPOSITE NON-WOVEN FABRIC AND ARTICLE COMPRISING SAME

(71) Applicant: TORAY ADVANCED MATERIALS KOREA INC., Gyeongsangbuk-do (KR)

(72) Inventors: Do Kyung Yoon, Gyeongsangbuk-do (KR); Geum Sig Shin, Gyeongsangbuk-do (KR)

(73) Assignee: Toray Advanced Materials Korea Inc., Gyeongsangbuk-do (KR)

( * ) Notice: Subject to any disclaimer, the term of this patent is extended or adjusted under 35 U.S.C. 154(b) by 295 days.

(21) Appl. No.: 17/917,849

(22) PCT Filed: Mar. 22, 2021

(86) PCT No.: PCT/KR2021/003499
§ 371 (c)(1),
(2) Date: Oct. 7, 2022

(87) PCT Pub. No.: WO2021/206312
PCT Pub. Date: Oct. 14, 2021

(65) Prior Publication Data
US 2023/0158428 A1    May 25, 2023

(30) Foreign Application Priority Data

Apr. 9, 2020 (KR) .................. 10-2020-0043511
Mar. 8, 2021 (KR) .................. 10-2021-0030146

(51) Int. Cl.
*B01D 39/16* (2006.01)
*A62B 23/02* (2006.01)
(Continued)

(52) U.S. Cl.
CPC ............ *B01D 39/1623* (2013.01); *B32B 3/30* (2013.01); *B32B 5/022* (2013.01); *B32B 5/269* (2021.05);
(Continued)

(58) Field of Classification Search
CPC ........... B32B 5/269; B32B 3/30; B32B 5/022; B32B 2250/20; B32B 2250/40;
(Continued)

(56) References Cited

U.S. PATENT DOCUMENTS

| | | |
|---|---|---|
| 5,227,172 A | 7/1993 | Deeds |
| 5,306,534 A | 4/1994 | Bosses |

(Continued)

FOREIGN PATENT DOCUMENTS

| | | | | |
|---|---|---|---|---|
| GB | 2496244 A | * | 5/2013 | ......... B32B 37/0076 |
| GB | 2518055 A | * | 3/2015 | ............ B32B 5/022 |

(Continued)

OTHER PUBLICATIONS

ASTM Standard D4966-98 (Year: 1998).*
(Continued)

*Primary Examiner* — Robert Clemente
(74) *Attorney, Agent, or Firm* — Snell & Wilmer L.L.P.

(57) ABSTRACT

Disclosed are a non-woven fabric composite and an article including the same. The disclosed non-woven fabric composite includes an at least partially electrostatically treated meltblown non-woven layer and a spunbond non-woven layer disposed on one or both sides thereof, pressure loss is less than 5.0 mmH$_2$O, and a size of the pilling mass after the Martindale abrasion test is less than 5 mm.

7 Claims, 2 Drawing Sheets

(51) Int. Cl.
*B32B 3/30* (2006.01)
*B32B 5/02* (2006.01)
*B32B 5/26* (2006.01)
*D04H 3/007* (2012.01)
*D04H 3/03* (2012.01)
*D04H 3/16* (2006.01)

(52) U.S. Cl.
CPC .............. *D04H 3/007* (2013.01); *D04H 3/03* (2013.01); *D04H 3/16* (2013.01); *A62B 23/025* (2013.01); *B01D 2239/0208* (2013.01); *B01D 2239/0435* (2013.01); *B01D 2239/0618* (2013.01); *B01D 2239/0622* (2013.01); *B01D 2239/0627* (2013.01); *B01D 2239/0668* (2013.01); *B01D 2239/1258* (2013.01); *B32B 2250/20* (2013.01); *B32B 2250/40* (2013.01); *B32B 2262/0253* (2013.01); *B32B 2307/724* (2013.01); *B32B 2571/00* (2013.01); *D10B 2321/022* (2013.01); *D10B 2401/00* (2013.01); *D10B 2505/04* (2013.01); *D10B 2509/00* (2013.01)

(58) Field of Classification Search
CPC .... B01D 2239/0208; B01D 2239/0435; B01D 2239/0618; B01D 2239/0622; B01D 2239/0668
See application file for complete search history.

(56) References Cited

U.S. PATENT DOCUMENTS

| | | | |
|---|---|---|---|
| 5,883,026 | A | 3/1999 | Reader et al. |
| 5,908,598 | A | 6/1999 | Rousseau et al. |
| 5,919,847 | A | 7/1999 | Rousseau et al. |
| 5,968,635 | A | 10/1999 | Rousseau et al. |
| 5,976,208 | A | 11/1999 | Rousseau et al. |
| 6,268,495 | B1 | 7/2001 | Rousseau et al. |
| 6,375,886 | B1 | 4/2002 | Angadjivand et al. |
| 6,969,484 | B2 | 11/2005 | Horiguchi et al. |
| 10,400,372 | B2 | 9/2019 | Shirotani et al. |
| 11,083,816 | B2 | 8/2021 | Kupelian et al. |
| 2004/0127132 | A1 | 7/2004 | Berman et al. |
| 2011/0064928 | A1 | 3/2011 | Bonneh |
| 2021/0086117 | A1* | 3/2021 | Avril ...................... B32B 38/06 |

FOREIGN PATENT DOCUMENTS

| | | | | |
|---|---|---|---|---|
| GB | 2569419 | A * | 6/2019 | ............. A61B 50/00 |
| JP | 2001355176 | A | 12/2001 | |
| JP | 2005124777 | A | 5/2005 | |
| JP | 2007037737 | A | 2/2007 | |
| JP | 2007054381 | A | 3/2007 | |
| JP | 4938260 | B2 * | 5/2012 | ............. A41D 13/11 |
| JP | 2014128758 | A | 7/2014 | |
| JP | 2021147711 | A | 9/2021 | |
| KR | 20150011129 | A | 1/2015 | |
| KR | 20170112539 | A | 10/2017 | |
| WO | 2021153296 | A1 | 8/2021 | |

OTHER PUBLICATIONS

JPO; Office Action dated Dec. 13, 2023 in Application No. 2022-561583.
CIPO; Chinese Office Action dated Apr. 28, 2024 for Chinese Patent Application No. 202180034997.0.
KIPO; International Search Report dated Jun. 28, 2021 in Application No. PCT/KR2021/003499.
KIPO; Written Opinion dated Jun. 28, 2021 in Application No. PCT/KR2021/003499.
KIPO; Office Action dated Jan. 30, 2023 in Application No. 10-2021-0030146.

* cited by examiner

COMPOSITE NON-WOVEN FABRIC AND ARTICLE COMPRISING SAME

TECHNICAL FIELD

Disclosed are a non-woven fabric composite and an article including the same. Specifically, a non-woven fabric composite having excellent pilling resistance and breathability and an article including the same are disclosed.

BACKGROUND ART

In the case of a mask for removing fine dust, the inner and outer skin materials and the filter material that filters fine dust in the center are composed as a multilayer composite.

As a filter layer, an electrostatically treated meltblown non-woven fabric is mainly used. A meltblown non-woven fabric has low dimensional stability due to low mechanical strength and high flexibility, so that structural deformation easily occurs, due to external impact or friction. Therefore, in order to protect the meltblown non-woven fabric layer and provide dimensional stability thereto, a non-woven fabric with high mechanical properties, such as dimensional stability and tensile strength, is stacked on both sides or one side of the meltblown non-woven fabric layer to form a mask. Mainly, a spunbond non-woven fabric is stacked on the meltblown non-woven fabric layer through a separate laminating process.

In addition, in the case of the spunbond non-woven fabric, which is generally applied as an inner and outer skin material on one or both sides of the electrostatically treated meltblown material, since the filament is thick and the pores thereof are large, the spunbond non-woven fabric has only a function of imparting dimensional stability with almost no fine dust removal efficiency. Therefore, since fine dust is filtered only in the filter layer located at the center of the multi-layered mask non-woven fabric configuration, fine dust is intensively stacked on the filter layer, and thus, the filtering efficiency decreases according to time of use. In particular, in industrial sites where masks must be worn for a long time, this issue may affect the respiratory safety of users.

In addition, since the non-woven fabric used as the inner and outer skin layer is bonded by ultrasonic welding along the outline of the mask, the structure of the electrostatically treated meltblown non-woven fabric of the inner layer is deformed during the welding process, and thus, the filtering performance thereof may be deteriorated.

In addition, the inner and outer skin materials used in the mask include cotton fabrics, non-woven fabric short fibers, and spunbond non-woven fabrics. In the inner and outer skin material for the mask, deformation of the material surface easily occurs, which is caused by friction due to direct contact with the user's skin, or due to contact with the hand in the user's environment, or due to contact during storage. In this case, the user feels discomfort due to the appearance and the strange tactile feel of the skin-contacting area.

DESCRIPTION OF EMBODIMENTS

Technical Problem

An embodiment of the disclosure provides a non-woven fabric composite having excellent pilling resistance and breathability.

Another embodiment of the disclosure provides an article including the non-woven fabric composite.

Solution to Problem

An aspect of the disclosure provides a non-woven fabric composite including: an at least partially electrostatically treated meltblown non-woven fabric layer; and a spunbond non-woven fabric layer disposed on one or both sides of the same, wherein a pressure loss is 5.0 mmH$_2$O or less, and a size of a pilling mass after the Martindale abrasion test is less than about 5 mm.

The non-woven fabric composite may have an embossed ratio of about 9% to about 19%.

The non-woven fabric composite may have an average area of one embossed pattern of about 0.06 mm$^2$ to about 0.6 mm$^2$.

The non-woven fabric composite may have an average slenderness ratio of one embossed pattern of 1.0 to 2.5.

The non-woven fabric composite may include a first spunbond non-woven fabric layer, a meltblown non-woven fabric layer, and a second spunbond non-woven fabric layer, and the meltblown non-woven fabric layer may be at least partially electrostatically treated.

The non-woven fabric composite may include the first spunbond non-woven fabric layer, the meltblown non-woven fabric layer, and the second spunbond non-woven fabric layer, in this order.

At least one of the first spunbond non-woven fabric layer and the second spunbond non-woven fabric layer may include at least one spunbond non-woven fabric sublayer.

The meltblown non-woven fabric layer may include at least one electrostatically treated meltblown non-woven fabric sublayer.

The meltblown non-woven fabric layer may include at least one electrostatically treated meltblown non-woven sublayer and at least one meltblown non-woven sublayer which is not electrostatically treated.

The non-woven fabric composite may further include at least one additional layer.

Another aspect of the present disclosure provides an article including the non-woven fabric composite.

The article may be a mask for removing fine dust, a filter for an air purifier, or a filter for an air conditioner.

Advantageous Effects of Disclosure

The non-woven fabric composite according to an embodiment of the present disclosure not only has excellent stain resistance and dimensional stability, but also an extended lifespan, and performance and stability of removal efficiency of the entire mask may be improved due to the multi-layered filter layer.

In addition, the non-woven fabric composite has excellent pilling resistance and breathability.

In addition, the non-woven fabric composite may be used for the purpose of removing various kinds of dust, fine dust, bacteria, and the like, and may be used as a medical or health mask.

MODE OF DISCLOSURE

Hereinafter, a non-woven fabric composite according to an embodiment will be described in detail.

The term "non-woven fabric composite", in the present specification, refers not to a non-woven fabric laminate manufactured through a separate laminating post-process after two or more kinds of non-woven fabrics are individually prepared, but to a non-woven fabric in which two or more kinds of non-woven fabrics are manufactured in a continuous process and integrated with each other. Therefore, "non-woven fabric composite", in the present specification, may also be referred to as "monolithic non-woven fabric". The non-woven fabric composite is characterized in that the interlayer bonding is strong, and the dimensional stability and the filtration performance are excellent, compared to the non-woven fabric laminate.

In addition, the "electrostatically treated non-woven fabric layer" or the "electrostatically treated non-woven fabric sub-layer", in the present specification, may be manufactured by a continuous process. Specifically, the "electrostatically treated non-woven fabric layer" or "electrostatically treated non-woven fabric sublayer" may be manufactured by sequentially or simultaneously performing "preparation of a non-woven fabric" and "electrostatical treatment" in a continuous process.

In addition, "electrostatically treated", in this specification, means a state in which an electric charge is semi-permanently applied to the non-woven fabric fibers to be able to form an electrostatic field between adjacent fibers, and the electrostatically treated non-woven fabric has a high charge density and fine dust removal efficiency compared to the non-woven fabric which is not electrostatically treated.

In addition, the term "at least partially electrostatically treated", used herein, means that the entire layer is electrostatically treated when the non-woven fabric layer consists of only one layer, and when the non-woven fabric layer consists of a plurality of sublayers, the term means that some sublayers are electrostatically treated, and the other sublayers are not electrostatically treated, or all sublayers are electrostatically treated.

Also, in the present specification, "charge enhancer" means a material that increases charge density.

In addition, in this specification, "fine dust permeability", "fine dust removal efficiency", and "pressure loss" were evaluated by the following method for the non-woven fabric composite after production and before use:

(1) Measurement device: TSI-8130 model of TSI company was used.

(2) Aerosol formation: The measurement device evaporated the water of the aqueous sodium chloride solution mist generated by a micro aerosol generating device to form sodium chloride aerosol dispersed in the air. An average particle diameter of sodium chloride particles in the formed sodium chloride aerosol was 0.3 μm, and a concentration of sodium chloride in the aerosol was 18.5 mg/m$^3$.

(3) Evaluation of fine dust permeability: A permeation face velocity of the aerosol was 16 cm/sec, and the evaluation area of the non-woven fabric was 100 cm$^2$. The permeability of the aerosol particles was recorded as the fine dust permeability.

(4) Evaluation of fine dust removal efficiency: Fine dust removal efficiency was evaluated according to Equation 1 below:

$$\text{Fine dust removal efficiency} = 100\% - \text{fine dust permeability} \quad \text{[Equation 1]}$$

(5) Evaluation of pressure loss: A permeation face velocity of the aerosol was 5 cm/sec, and the evaluation area of the non-woven fabric was 100 cm$^2$.

The non-woven fabric composite according to an embodiment of the present disclosure includes an at least partially electrostatically treated meltblown non-woven fabric layer and a spunbond non-woven fabric layer disposed on one or both sides thereof.

The non-woven fabric composite may have a fine dust removal efficiency of about 20% to about 99.9%, about 30% to about 99.9%, about 40% to about 99.9%, about 50% to about 99.9%, about 60% to about 99.9%, about 70% to about 99.9%, about 80% to about 99.9%, or about 90% to about 99.9%.

The non-woven fabric composite may have a pressure loss of 5.0 mmH$_2$O or less, 4.0 mmH$_2$O or less, 3.0 mmH$_2$O or less, or 2.0 mmH$_2$O or less.

In addition, the non-woven fabric composite may have a size of a pilling mass after the Martindale abrasion test of less than 5 mm, less than 4 mm, less than 3 mm, or less than 2 mm. Accordingly, the non-woven fabric composite has advantages in that pilling is suppressed and air permeability is high.

In addition, the non-woven fabric composite may have an embossed ratio (=total area of embossed patterns/total area of non-woven fabric composite×100=total area of embossed patterns of a pattern roll among calender rolls/total area of an upper surface of a pattern roll among calender rolls×100) of about 9% to about 19%. When the embossed area of the non-woven fabric composite is within the above range, a non-woven fabric composite having a low pilling rate and a small pressure loss may be obtained.

In addition, the non-woven fabric composite may have an average area of one embossed pattern of about 0.06 mm$^2$ to about 0.6 mm$^2$. When the average area of one embossed pattern is within the above range, a non-woven fabric composite having a low pilling rate and a small pressure loss may be obtained.

In addition, the non-woven fabric composite may have an average slenderness ratio (long axis/short axis) of one embossed pattern of 1.0 to 2.5. When the average slenderness ratio of one embossed pattern of a non-woven fabric composite is within the range, a non-woven fabric composite having a low pilling rate may be obtained.

The non-woven fabric composite may have an excellent fine particle collection function due to the inclusion of an at least partially electrostatically treated meltblown non-woven fabric layer. However, since a spunbond-meltblown multilayer non-woven fabric of the related art has an average pore size of several to several tens of micrometers (μm), it hardly has a function of removing fine particles having a size at the level of 0.1 μm to 0.6 μm.

The non-woven fabric composite may include a first spunbond non-woven fabric layer, a meltblown non-woven fabric layer, and a second spunbond non-woven fabric layer.

The meltblown non-woven fabric layer may be at least partially electrostatically treated.

The non-woven fabric composite may include the first spunbond non-woven fabric layer, the meltblown non-woven fabric layer, and the second spunbond non-woven fabric layer, in this order. However, the present disclosure is not limited thereto, and the non-woven fabric composite may include the first spunbond non-woven fabric layer, the meltblown non-woven fabric layer, and the second spunbond non-woven fabric layer, in a different order.

The melt blown non-woven fabric layer may include a charge enhancer to be described later.

At least one of the first spunbond non-woven fabric layer and the second spunbond non-woven fabric layer may include at least one spunbond non-woven fabric sublayer. For example, at least one of the first spunbond non-woven fabric layer and the second spunbond non-woven fabric layer may include a plurality of spunbond non-woven fabric sublayers that are manufactured in a continuous process and integrated with each other.

The meltblown non-woven fabric layer may include at least one electrostatically treated meltblown non-woven fabric sublayer. For example, the meltblown non-woven fabric layer may include a plurality of electrostatically treated meltblown non-woven fabric sublayers that are each manufactured in a continuous process and integrated with each other.

The meltblown non-woven fabric layer may include at least one electrostatically treated meltblown non-woven sublayer and at least one meltblown non-woven sublayer which is not electrostatically treated. Specifically, the meltblown non-woven fabric layer may include at least one electrostatically treated meltblown non-woven fabric sublayer, and at least one meltblown non-woven fabric sublayer which is not electrostatically treated, which are each manufactured in a continuous process and integrated with each other.

At least one spunbond non-woven fabric, at least one electrostatically treated meltblown non-woven fabric, and/or at least one non-electrostatically treated meltblown non-woven fabric, which are included in the non-woven fabric composite may each independently include a non-conductive polymer.

The non-conductive polymer may include polyolefin, polystyrene, polycarbonate, polyester, polyamide, a copolymer thereof, or a combination thereof.

The polyolefin may include polyethylene, polypropylene, poly-4-methyl-1-pentene, polyvinyl chloride, or a combination thereof.

The polyester may include polyethylene terephthalate, polylactic acid, or a combination thereof.

Each of the spunbond non-woven fabrics, each of the electrostatically treated meltblown non-woven fabrics, and/or each of the non-electrostatically treated meltblown non-woven fabrics may each independently include an additive.

The additive may include pigments, light stabilizers, primary antioxidants, secondary antioxidants, metal deactivators, hindered amines, hindered phenols, fatty acid metal salts, triester phosphites, phosphates, fluorine-containing compounds, nucleating agents, or combinations thereof.

Also, in an embodiment, the antioxidant may function as a charge enhancer. Charge enhancers available herein may include thermally stable organic triazine compounds, oligomers, or combinations thereof, and these compounds or oligomers may further contain at least one nitrogen atom in addition to the nitrogen in the triazine ring.

For example, a charge enhancer for the purpose of improving electrification characteristics is disclosed in U.S. Pat. Nos. 6,268,495, 5,976,208, 5,968,635, 5,919,847, and 5,908,598. For example, the charge enhancers may include a hindered amine-based additive, a triazine additive, or a combination thereof.

For another example, the charge enhancer may include: poly[((6-(1,1,3,3-tetramethylbutyl)imino-1,3,5-triazine-2,4-diyl) ((2,2,6,6-tetramethyl-4-piperidyl)imino)hexamethylene((2,2,6,6-tetramethyl-4-piperidyl)imino)](manufactured by BASF, CHIMASSORB 944); a mixture of 1,6-hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine) (manufactured by BASF, CHIMASSORB 2020); or a combination thereof. The charge enhancer may be N-substituted amino aromatic compounds, especially tri-amino substituted compounds such as 2,4,6-trianilino-p-(carbo-2'-ethylhexyl-1'-oxy)-1,3,5-triazine (manufactured by BASF, UVINUL T-150). Other charge enhancers include 2,4,6-tris-(octadecylamino)-triazine, also known as tristearyl melamine ("TSM"), alpha-alkenes (C20-C24) maleic anhydride-4-amino-2,2,6,6-tetramethylpiperidine (manufactured by BASF, Uvinul 5050H), or a mixture of 4-hydroxy-2,2,6,6-tetramethyl-1-piperidine ethanol (manufactured by BASF, Tinuvin 622SF).

An amount of the charge enhancer may be 0.25 parts by weight to 5 parts by weight with respect to 100 parts by weight of the total weight of each spunbond non-woven fabric or the total weight of each electrostatically treated meltblown non-woven fabric. When the amount of the charge enhancer is within this range, a high level of electrification performance targeted by the disclosure may be obtained, and good spinnability, high strength of the non-woven fabric, and low costs may be obtained.

The non-woven fabric composite may further include generally known additives, such as a heat stabilizer and a weathering agent, in addition to the additives.

A total amount of the electrostatically treated meltblown non-woven fabric in the non-woven fabric composite may be 3 parts by weight to 50 parts by weight with respect to 100 parts by weight of the total weight of the non-woven fabric composite. When the total amount of the electrostatically treated meltblown non-woven fabric is within the range, a non-woven fabric composite having excellent filtration performance, dimensional stability, and durability may be obtained.

The non-woven fabric composite may have a basis weight (mass per unit area) of 10 g/m$^2$ to 500 g/m$^2$, for example, 20 g/m$^2$ to 100 g/m$^2$.

A plurality of non-woven fabrics included in the non-woven fabric composite may be integrated (i.e., bonded) with each other by thermal fusion rather than ultrasonic welding.

The non-woven fabric composite may further include at least one additional layer.

As an example, each of the additional layers may include at least one separate non-woven fabric that is neither a spunbond non-woven fabric nor a meltblown non-woven fabric.

As another example, each of the additional layers may include one or more layers made of a material other than a non-woven fabric.

Hereinafter, a method of manufacturing the non-woven fabric composite according to an embodiment will be described in detail.

The method of manufacturing the non-woven fabric composite according to an embodiment includes continuous formation of a spunbond non-woven fabric layer (S10) and continuous formation of a meltblown non-woven fabric layer on the spunbond non-woven fabric layer (S20).

The continuous formation of the spunbond non-woven layer (S10) may be performed by melt-extruding, cooling, and stretching a thermoplastic non-conductive polymer to form a fiber yarn, and then stacking the fiber yarn on a screen belt to form a web.

The continuous formation of the meltblown non-woven layer (S20) may be performed by melt-extruding, hot-air stretching, and cooling a thermoplastic non-conductive polymer (a charge enhancer may be added) to form a fiber yarn, and then stacking the fiber yarn on the spunbond non-woven fabric, which is formed as a web in the continuous formation of a spunbond non-woven fabric layer (S10), to form a web.

For example, the continuous formation of the meltblown non-woven fabric layer (S20) may include continuously forming free fibers with a non-conductive polymer (a charge enhancer may be added) (S20-1), continuously spinning the free fibers (S20-2), continuously spraying a polar solvent (for example, water) onto the free fibers to continuously charge the free fibers (S20-3), and continuously integrating the free fibers to continuously form a meltblown non-woven fabric (S20-4).

The continuous electrification of free fibers (S20-3) may be performed by continuously spraying the polar solvent together with a gas (for example, air) onto the free fiber.

Hereinafter, it will be described in detail that the continuous electrification of free fibers (S20-3) has a heterogeneous or significant effect compared to the related art.

(1) Generally, as a method in which an electrostatical treatment is performed during the meltblown process, the method disclosed in U.S. Pat. No. 6,375,886, in which the electrostatical treatment is performed through friction between a polar solvent and a filament during melt spinning, and the method disclosed in U.S. Pat. No. 6,969,484, in which the meltblown non-woven fabric is immersed in a polar solvent and during water permeates through the non-woven fabric by using a suction device, the electrostatical treatment is performed through friction between the water and the non-woven fabric, are mainly applied in the industry to prepare an electrostatically treated meltblown non-woven fabric. The electrostatical treatment method using a polar solvent requires a separate post-process of drying the polar solvent after the electrostatical treatment, and therefore, it is fundamentally impossible to laminate the plurality of non-woven fabrics or to make a non-woven fabric composite using the plurality of non-woven fabrics in a continuous process. U.S. Pat. Nos. 6,375,886 and 6,969,484 are incorporated herein by reference in their entirety.

(2) U.S. Pat. No. 5,227,172 discloses a method in which a high potential difference is applied between a meltblown die and a collector, so that the melt-spun resin is filamentized and inductively electrostatically treated by the surrounding electric field. In this method, an electrostatically treated meltblown non-woven fabric may be obtained without a separate post-processing. However, the non-woven fabric inductively charged by the electric potential difference in this way exhibits a phenomenon that the electrostatical treatment efficiency is rapidly reduced depending on heat or the surrounding environment. Accordingly, the application thereof may be difficult in the case of a mask for removing fine dust in which long-term storage is required, or in the case of filters for air purifiers in which a long service life should be guaranteed. U.S. Pat. No. 5,227,172 is incorporated herein by reference in its entirety.

The inventors of the present application developed an electrostatical treatment device in which a polar solvent is sprayed in the form of a two-fluid form together with air on the meltblown non-woven fabric layer, and the polar solvent particles having sufficient kinetic energy in a small spray amount is caused to have friction with the filament being melt-spun to have a high-efficiency friction electrification effect. In such an electrostatical treatment device, since sufficient heating and evaporation may occur within the die-to-collector distance (DCD) section due to the small spray amount, a separate drying facility is not needed. Due to these features, the electrostatical treatment device has an advantage of being capable of making a non-woven fabric composite by continuous stacking in combination with the non-woven fabric manufacturing process.

The non-woven fabric obtained by electrostatically treating the meltblown non-woven fabric is in a continuously polarized state so that negative charge and positive charge exist semi-permanently, and this non-woven fabric is called an electret non-woven fabric.

As described above, the method of manufacturing the non-woven fabric composite may not include a separate drying process for removing the polar solvent sprayed in the continuous charging of free fibers (S20-3).

In addition, as described above, the polar solvent continuously sprayed in the continuous charging of free fibers (S20-3), may be continuously heated by air heated within the DCD section of the non-woven fabric composite manufacturing apparatus and may evaporate.

The manufacturing method of the non-woven fabric composite may further include continuous formation of another spunbond non-woven fabric layer on the meltblown non-woven fabric layer (S30), in the same manner as the continuous formation of a spunbond non-woven layer (S10).

The method of manufacturing the non-woven fabric composite may further include continuously thermocompressing the spunbond non-woven fabric layer on one or both sides of the meltblown non-woven fabric layer (S40), after the continuous formation of the meltblown non-woven fabric layer (S20), or the continuous formation of the other spunbond non-woven fabric layer (S30).

The thermocompressing (S40) may be performed by passing the meltblown non-woven fabric and the at least one spunbond non-woven fabric between calender rolls including a first roll (i.e., a pattern roll) on which a plurality of embossed patterns having the same shape are formed and a second roll (smooth roll) without bumps. By controlling the ratio of the upper surface area of the embossed patterns formed on the surface of the first roll among the calender rolls (=total area of the embossed patterns of the first roll/total area of the upper surface of the first roll×100), the size of the upper surface area, and the shape of the upper surface area, the embossed ratio of the finally produced non-woven fabric composite, the average area of one embossed pattern, and the average slenderness ratio of one embossed pattern may be adjusted.

Figure 1:
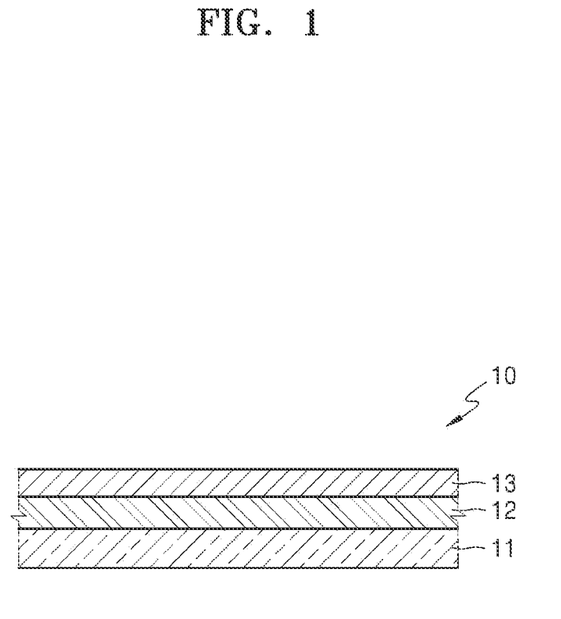
FIG. 1 schematically shows a non-woven fabric composite according to an embodiment of the present disclosure.
Figure 2:
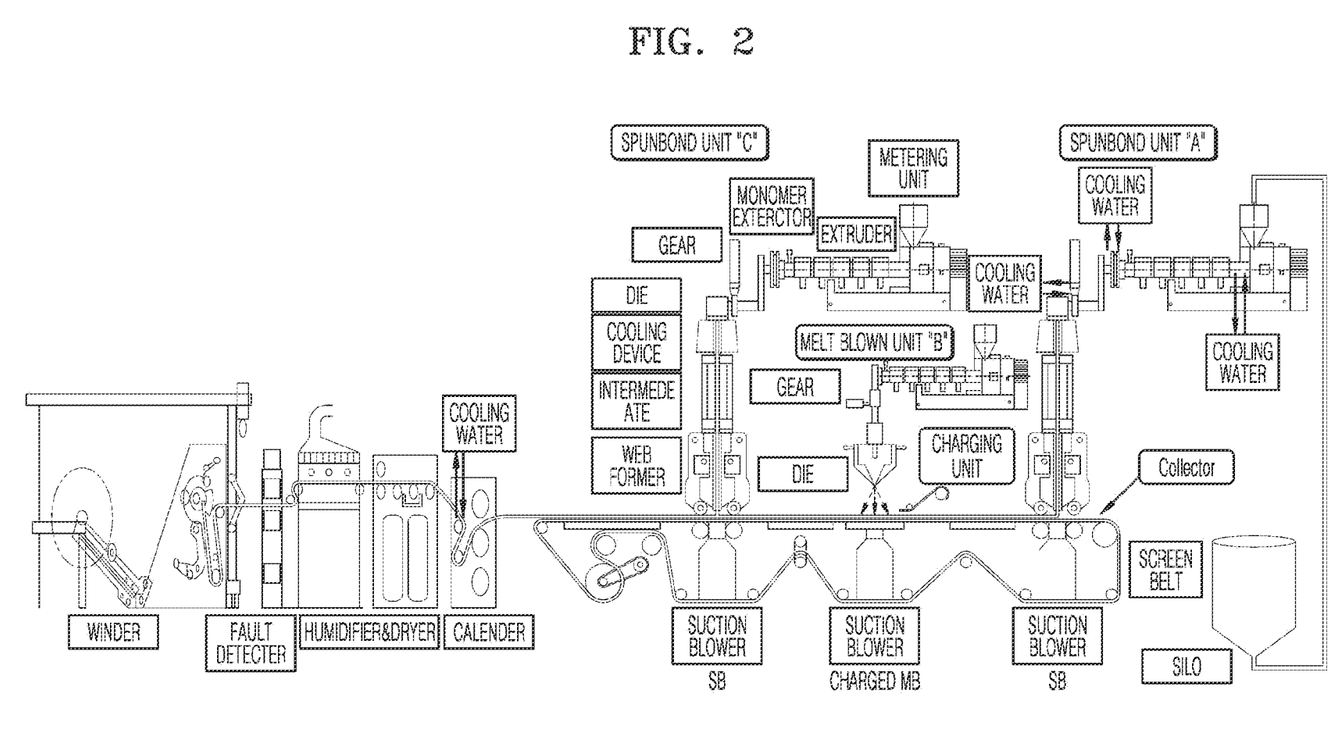
FIG. 2 is a diagram schematically showing an apparatus for manufacturing a non-woven fabric composite used for continuously manufacturing a non-woven fabric composite according to an embodiment.

FIG. 1 schematically shows a non-woven fabric composite 10 according to an embodiment of the present disclosure.

The non-woven fabric composite 10 according to an embodiment of the present disclosure includes a first spunbond non-woven fabric layer 11, an at least partially electrostatically treated meltblown non-woven fabric layer 12, and a second spunbond non-woven fabric layer 13.

In addition, by modifying the manufacturing method of the non-woven fabric composite, a non-woven fabric composite having various structures and/or configurations may be manufactured.

Hereinafter, an article according to an embodiment will be described in detail.

An article according to an embodiment may include the non-woven fabric composite described in detail.

The article may be a mask for removing fine dust, a filter for an air purifier, or a filter for an air conditioner.

Hereinafter, the present disclosure will be described in more detail through examples. These examples are for explaining the disclosure in more detail, and the scope of the disclosure is not limited to these examples.

Example 1: Preparation of Non-Woven Fabric Composite

A propylene homopolymer (LG Chemical, H7900) having a melt index (MI) of 34 g/10 min was used as a polymer for forming a spunbond non-woven fabric layer (SB), and a resin (LG Chem, H7910) having a melting flow index (MFR) of 1,000 g/10 min was used as a polymer for forming a meltblown non-woven fabric layer. In addition, Chimasorb 944, which is a hindered amine light stabilizer, was added to the polymer for forming the meltblown non-woven fabric layer (MB) in an amount of 0.5 wt %. Thereafter, a non-woven fabric composite in the form of spunbond-meltblown-spunbond (SMS) was continuously manufactured using the apparatus for manufacturing a non-woven fabric composite as shown in FIG. 1. Specifically, in the apparatus for manufacturing the non-woven fabric composite, the meltblown non-woven fabric layer (MB) was continuously electrostatically treated by being contacted with water together with air through a two-fluid nozzle, and then was stacked on the spunbond non-woven fabric layer (SB), and another spunbond non-woven fabric layer (SB) was stacked on the meltblown non-woven fabric layer (MB). As a result, an SMS non-woven fabric composite precursor was obtained. Thereafter, the SMS non-woven fabric composite precursor was manufactured in the form of a single non-woven fabric composite through a thermocompression process between calender rolls including a first roll on which a plurality of embossed patterns having the same shape are formed and a second roll without bumps. Here, the calender roll had an embossed ratio of 14%, an average area of one embossed pattern was 0.33 mm$^2$, and an average slenderness ratio of one embossed pattern was 1.75. In addition, the total basis weight of the SMS non-woven fabric composite was adjusted to be 100 gsm (g/m$^2$), and the basis weight of the meltblown non-woven fabric layer (MB) was adjusted to be 22 gsm.

Example 2: Preparation of Non-Woven Fabric Composite

An SMS non-woven fabric composite was prepared in the same manner as in Example 1, except that the calender roll was replaced with a calender roll having an embossed ratio of 9%, an average area of one embossed pattern of 0.33 mm$^2$, and an average slenderness ratio of one embossed pattern of 1.75.

Example 3: Preparation of Non-Woven Fabric Composite

An SMS non-woven fabric composite was prepared in the same manner as in Example 1, except that the calender roll was replaced with a calender roll having an embossed ratio of 19%, an average area of one embossed pattern of 0.33 mm$^2$, and an average slenderness ratio of one embossed pattern of 1.75.

Example 4: Preparation of Non-Woven Fabric Composite

An SMS non-woven fabric composite was prepared in the same manner as in Example 1, except that the calender roll was replaced with a calender roll having an embossed ratio of 14%, an average area of one embossed pattern of 0.06 mm$^2$, and an average slenderness ratio of one embossed pattern of 1.75.

Example 5: Preparation of Non-Woven Fabric Composite

An SMS non-woven fabric composite was prepared in the same manner as in Example 1, except that the calender roll was replaced with a calender roll having an embossed ratio of 14%, an average area of one embossed pattern of 0.6 mm$^2$, and an average slenderness ratio of one embossed pattern of 1.75.

Example 6: Preparation of Non-Woven Fabric Composite

An SMS non-woven fabric composite was prepared in the same manner as in Example 1, except that the calender roll was replaced with a calender roll having an embossed ratio of 14%, an average area of one embossed pattern of 0.33 mm$^2$, and an average slenderness ratio of one embossed pattern of 1.0.

Example 7: Preparation of Non-Woven Fabric Composite

An SMS non-woven fabric composite was prepared in the same manner as in Example 1, except that the calender roll was replaced with a calender roll having an embossed ratio of 14%, an average area of one embossed pattern of 0.33 mm$^2$, and an average slenderness ratio of one embossed pattern of 2.5.

Comparative Example 1: Preparation of Non-Woven Fabric Composite

An SMS non-woven fabric composite was prepared in the same manner as in Example 1, except that the calender roll was replaced with a calender roll having an embossed ratio of 8%, an average area of one embossed pattern of 0.33 mm$^2$, and an average slenderness ratio of one embossed pattern of 1.75.

Comparative Example 2: Preparation of Non-Woven Fabric Composite

An SMS non-woven fabric composite was prepared in the same manner as in Example 1, except that the calender roll was replaced with a calender roll having an embossed ratio of 20%, an average area of one embossed pattern of 0.33 mm$^2$, and an average slenderness ratio of one embossed pattern of 1.75.

Comparative Example 3: Preparation of Non-Woven Fabric Composite

An SMS non-woven fabric composite was prepared in the same manner as in Example 1, except that the calender roll was replaced with a calender roll having an embossed ratio of 14%, an average area of one embossed pattern of 0.05 mm$^2$, and an average slenderness ratio of one embossed pattern of 1.75.

Comparative Example 4: Preparation of Non-Woven Fabric Composite

An SMS non-woven fabric composite was prepared in the same manner as in Example 1, except that the calender roll was replaced with a calender roll having an embossed ratio of 14%, an average area of one embossed pattern of 0.7 mm², and an average slenderness ratio of one embossed pattern of 1.75.

Comparative Example 5: Preparation of Non-Woven Fabric Composite

An SMS non-woven fabric composite was prepared in the same manner as in Example 1, except that the calender roll was replaced with a calender roll having an embossed ratio of 14%, an average area of one embossed pattern of 0.33 mm², and an average slenderness ratio of one embossed pattern of 3.0.

The embossed ratio (%) (=total area of embossed patterns of the first roll/total upper surface area of the first roll×100), average area of one embossed pattern, and average slenderness ratio (length of the long axis/length of the short axis) of one embossed pattern of the non-woven fabric composites prepared in Examples 1 to 7 and Comparative Examples 1 to 5 were measured, and the results are shown in Table 1.

TABLE 1

| | Example | | | | | |
|---|---|---|---|---|---|---|
| | 1 | 2 | 3 | 4 | 5 | 6 |
| Embossed ratio (%) | 14 | 9 | 19 | 14 | 14 | 14 |
| Average area of one embossed pattern (mm²) | 0.33 | 0.33 | 0.33 | 0.06 | 0.6 | 0.33 |
| Average slenderness ratio of one embossed pattern (long axis/short axis) | 1.75 | 1.75 | 1.75 | 1.75 | 1.75 | 1.0 |

| | Example | Comparative Example | | | | |
|---|---|---|---|---|---|---|
| | 7 | 1 | 2 | 3 | 4 | 5 |
| Embossed ratio (%) | 14 | 8 | 20 | 14 | 14 | 14 |
| Average area of one embossed pattern (mm²) | 0.33 | 0.33 | 0.33 | 0.05 | 0.7 | 0.33 |
| Average slenderness ratio of one embossed pattern (long axis/short axis) | 2.5 | 1.75 | 1.75 | 1.75 | 1.75 | 3.0 |

Evaluation Example: Evaluation of Properties of Non-Woven Fabrics

The pressure loss, weight, pressure loss/weight, size of the pilling mass, and process stability of each of the non-woven fabric composites prepared in Examples 1 to 7, Comparative Examples 1 to 5 and Reference Example 1 were evaluated in the following way, and the results are shown in Table 2.
(1) Measurement device: TSI-8130 model of TSI company was used.
(2) Formation of aerosol: By using the measurement device, the aqueous sodium chloride solution was brought into contact with air and then the water was evaporated therefrom to form an aerosol, which is dispersed in air, contains sodium chloride, and has an average particle diameter of 0.3 μm and a sodium chloride particle concentration of 18.5 mg/m³.
(3) Evaluation of aerosol removal efficiency: The aerosol permeation flow rate was 95 L/min, and the evaluation area of the non-woven fabric was 100 cm².
(4) Evaluation of pressure loss: The aerosol permeation flow rate was 30 L/min, and the evaluation area of the non-woven fabric was 100 cm².
(5) Weight evaluation: measured according to ASTM D 3776-1985.
(6) Evaluation of the size of the pilling mass: "pilling resistance" was evaluated by performing the Martindale abrasion test. This test measures relative resistance to abrasion of non-woven fabrics by evaluating the state of the appearance of the nonwoven fabric having fluffs and/or small lumps on the surface thereof, wherein the fluffs are formed as fibers constituting the nonwoven fabric protrude from the surface of the nonwoven fabric due to abrasion caused by contact with an abrasive agent, and the small lumps are formed as the fluffs are entangled. This test was performed by using a Martindale Wear and Abrasion Tester, such as model number 404, commercially available from James H. Heal & Company, Ltd., (West Yorkshire, UK.). The abrasive agent used was a silicone rubber wheel (Maker: VIP Rubber & Plastic Company. Inc., model name: 86045K21-50A). The abrasion test was performed according to ASTM D4966-98 standard. Abrasion causes the following changes in appearance. That is, the appearance deformation occurs in the order that fuzzy filaments, pills (fuzzy balls became lumpy), ropes, and spider-webs form. The short fibers generated on the surface of the non-woven fabric due to abrasion are called fuzzy filaments. In the case of a non-woven fabric with low resistance to abrasion, the size of a pill is 5 mm or more, or pills and fuzzy filaments are agglomerated to form a rope with a height of 5 mm or more, or a spider-web, and a non-woven fabric having this shape cannot be used for a mask. In this specification, "pill", "rope" and "spider-web" are collectively referred to as a pilling mass. The size measurement of the pilling mass described in the present specification is to measure the height of the lump shape that protrudes in the form of a pill, a rope, or a spider-web by lumping on the upper surface of the non-woven fabric, and the reference plane for the measurement is the upper surface of the non-woven fabric. When measuring, the height of the pilling mass was measured by using a ruler from the side in a state, in which no external pressure was applied to the non-woven fabric. Fuzzy filaments in a form of short non-agglomerated fibers were not evaluated.
(7) Evaluation of process stability: When manufacturing an integrated non-woven fabric composite through a thermal fusion process, the non-woven fabrics pass between two calender rolls, and thermal fusion occurs in the form of an embossed pattern by the heat and compression force transferred to the non-woven fabrics. When the area of the embossed pattern protruding from the surface of the calender roll becomes small, the shape of the embossed pattern, which is formed on the non-woven fabric composite during thermocompression between the rolls, is damaged, making normal thermocompression impossible. Whether or not a damage of the embossed pattern occurred was observed and, when a damage did not occur, the process stability was evaluated as good.

TABLE 2

|  | Example | | | | | |
|---|---|---|---|---|---|---|
|  | 1 | 2 | 3 | 4 | 5 | 6 |
| Pressure loss (mmH$_2$O) | 3.8 | 3.1 | 4.5 | 3.9 | 3.8 | 3.7 |
| Weight (gsm) | 53 | 53 | 53 | 53 | 53 | 53 |
| Pressure loss/weight (mmH$_2$O/gsm) | 0.072 | 0.058 | 0.085 | 0.074 | 0.072 | 0.070 |
| Size of the pilling mass (mm) | 2.6 | 4.5 | 0.7 | 1.3 | 4.8 | 2.1 |
| Process stability | Good | Good | Good | Good | Good | Good |

|  | Example | Comparative Example | | | | |
|---|---|---|---|---|---|---|
|  | 7 | 1 | 2 | 3 | 4 | 5 |
| Pressure loss (mmH$_2$O) | 3.5 | 2.8 | 5.5 | 4.2 | 3.7 | 3.9 |
| Weight (gsm) | 53 | 53 | 53 | 53 | 53 | 53 |
| Pressure loss/weight (mmH$_2$O/gsm) | 0.066 | 0.053 | 0.104 | 0.079 | 0.070 | 0.074 |
| Size of the pilling mass (mm) | 4.6 | 6.5 | 2.1 | 1.2 | 5.8 | 7.3 |
| Process stability | Good | Good | Good | Embossed pattern damaged | Good | Good |

Referring to Table 2, the non-woven fabric composites prepared in Examples 1 to 7 had a low pressure loss of 5 mmH$_2$O or less, the size of the pilling mass was small (less than 5 mm), and the process stability was also good.

However, although the non-woven fabric composites prepared in Comparative Examples 1, 4 and 5 had a low pressure loss of 5 mmH$_2$O or less, and good process stability, the size of the pilling mass was 5 mm or more and was shown to be large.

In addition, the non-woven fabric composite prepared in Comparative Example 2 had a small size of the pilling mass of less than 5 mm and good process stability, but showed a high pressure loss exceeding 5 mmH$_2$O.

In addition, the non-woven fabric composite prepared in Comparative Example 3 had a low pressure loss of 5 mmH$_2$O or less, and the size of the pilling mass was also small as less than 5 mm, but the embossed pattern was damaged and the process stability was shown to be poor.

Although the disclosure has been described with reference to the drawings and examples, it will be understood that these are an example only, and that those of ordinary skill in the art can make various modifications and equivalent other embodiments therefrom. Accordingly, the true technical protection scope of the disclosure should be defined by the technical idea of the appended claims.

The invention claimed is:

1. A non-woven fabric composite in which two or more kinds of non-woven fabrics are manufactured in a continuous process and integrated with each other, comprising: an at least partially electrostatically treated meltblown non-woven fabric layer; and a spunbond non-woven fabric layer disposed on one or both sides thereof,
   wherein the non-woven fabric comprises a first spunbond non-woven fabric layer, a meltblown non-woven fabric layer, and a second spunbond non-woven fabric layer,
   wherein the meltblown non-woven fabric layer is at least partially electrostatically treated,
   wherein the non-woven fabric composite comprises the first spunbond non-woven fabric layer, the meltblown non-woven fabric layer, and the second spunbond non-woven fabric layer, in this order,
   wherein an embossed ratio is 9% to 19%, an average area of one embossed pattern is 0.06 mm$^2$ to 0.6 mm$^2$, an average slenderness ratio of one embossed pattern is 1.0 to 2.5,
   wherein a pressure loss is 5.0 mmH$_2$O or less, and a size of a pilling mass after the Martindale abrasion test is less than 5 mm,
   wherein the size of a pilling mass is defined as the height of a lumpshaped protrusion, such as a pill, rope, or spiderweb, measured from the upper surface of the nonwoven fabric using a ruler from the side, in a state in which no external pressure is applied to the nonwoven fabric, after the Martindale abrasion test is performed according to ASTM D496698 using a silicone rubber wheel as an abrasive agent, wherein the abrasion test is conducted until appearance deformation progresses through the stages of fuzzy filaments, pills, ropes, and spiderwebs, and the term 'pilling mass' collectively refers to the lumpshaped protrusions formed in the pill, rope, and spiderweb stages, excluding fuzzy filaments.

2. The non-woven fabric composite of claim 1, wherein at least one of the first spunbond non-woven fabric layer and the second spunbond non-woven fabric layer comprises at least one spunbond non-woven fabric sublayer.

3. The non-woven fabric composite of claim 1, wherein the meltblown non-woven fabric layer comprises at least one electrostatically treated meltblown non-woven fabric sublayer.

4. The non-woven fabric composite of claim 3, wherein the meltblown non-woven fabric layer comprises at least one electrostatically treated meltblown non-woven sublayer and at least one meltblown non-woven sublayer which is not electrostatically treated.

5. The non-woven fabric composite of claim 1 further comprising at least one additional layer.

6. An article comprising the non-woven fabric composite of claim 1.

7. The article of claim 6, wherein the article is a mask for removing fine dust, a filter for an air purifier, or a filter for an air conditioner.

\* \* \* \* \*